Patented Mar. 30, 1943

2,314,996

UNITED STATES PATENT OFFICE 2,314,996

METHOD OF IMPROVING THE ADHESION OF RUBBER TO COTTON

Edward T. Lessig and Ivan Gasdik, Akron, Ohio, assignors to The B. F. Goodrich Company, New York, N. Y., a corporation of New York No Drawing. Application February 11, 1939, Serial No. 255,890

1 Claim. (Cl. 117—7)

This invention relates to the adhesion of rubber to cotton in the form of cords, fabrics, and the like.

The length of service of many articles of commerce embodying cotton and rubber such as tires and belts, for instance, is largely dependent upon the degree of adhesion between the rubber and the cotton. The industrial importance of such articles has led to a continual search for methods of increasing said adhesion. It is an object of this invention, accordingly, to provide a method whereby remarkable improvement in the adhesion between rubber and cotton may be obtained.

It is known that the adhesion between rayon and rubber may be improved by a treatment at room temperature with a heat-hardening polyhydricphenol-aldehyde-latex adhesive, of which resorcinol-formaldehyde-latex dispersions are the most midely used. When this treatment is applied to cotton cords, however, no consistent improvement in the adhesion between the cords and the rubber is obtained. In some cases the adhesion is decreased, in other cases slight improvements are obtained, but in no case does this treatment consistently produce any marked increase in adhesion.

We have discovered that the adhesion of rubber to cotton may be increased by treatment with a heat-hardening polyhydricphenol-aldehyde-latex adhesive if the cotton is pretreated with a penetrant.

Penetrants are strongly polar compounds comprising a nonpolar hydrocarbon portion of high molecular weight, at some point in which is located a sufficiently polar or water-soluble group to endow the molecule with the property of at least colloidal solubility in water. Penetrants are often characterized as possessing "surface activity" because of the reduction in interfacial tension effected by the compounds, and because of their property of peptizing the non-cellulosic portions of the cord. Although soap was formerly the best penetrant, the synthetic saponaceous penetrants, of which a considerable number are now known, have more desirable properties and are preferred in this invention. Sodium fatty alcohol sulfates which are ordinarily produced by the hydrogenation of fats and fatty acids and the sulfation of the product are as a class good penetrants. Other classes of materials useful as penetrants include the alkali metal salts of sulfated fatty acid esters, of sulfated fatty acid amides, of secondary alcohol sulfates, of sulfated esters of higher alcohols and dibasic acids, and of mono- and di-alkyl substituted aromatic sulfonates.

To illustrate the invention, cotton tire cord was boiled for ½ min. in aqueous solutions (unless otherwise specified) of various penetrants under varying conditions in a relaxed state, dried under tension, dipped at room temperature in a resorcinol-formaldehyde-latex dispersion and thoroughly dried at 185° F. The treated cords were then tested for adhesion by vulcanizing rubber containing the cord, cutting from the rubber cylindrical samples in which the cord was diametrically disposed, and compressing the cylinders in a Tinius-Olsen testing machine until separation occurred between the cord and the rubber.

| Pretreatment: | Per cent increase in adhesion |
|---|---|
| 0.5% Dispersaid A | 174 |
| 0.5% Tergitol #7 | 158 |
| 0.5% Aquarex D | 157 |
| 0.5% Alphasol O. T | 155 |
| 0.5% Aresket in alcohol | 147 |
| 0.5% Ivory soap | 144 |

Although the best results are ordinarily obtained by pretreatment with a penetrant at elevated temperatures, excellent results are obtained at room temperatures. Cotton tire cord was dipped at room temperature in the following penetrants, dried under tension, then given a double treatment with resorcinol-formaldehyde-latex dispersion.

| Pretreatment: | Per cent increase in adhesion |
|---|---|
| 0.5% Neckal B. X. in alcohol | 168 |
| 0.5% Tergitol #7 in water | 153 |
| 0.5% Alphasol in alcohol | 142 |
| 0.5% Aresket in alcohol | 139 |

Applicants have been informed that Aquarex D is the sodium salt of the sulfated alcohols containing from 12–18 carbon atoms, that Neckal B. X. is a sodium dialkyl naphthalene sulfonate, and that Tergitol #7 is the sodium salt of sulfated secondary alkyl alcohols. The other materials are commercially available penetrants of whose composition applicants are unaware.

It will be noted that in the above embodiments the cord was subjected to the action of the penetrant in a relaxed state and stretched to its original length and dried before the resorcinol-formaldehyde-latex treatment. Large increases in adhesion have been obtained by treating the cords with resorcinol-formaldehyde-latex dispersion in a relaxed, wet state, although the above treatment is preferred.

The polyhydricphenol-aldehyde-latex dispersions with which the cords are subsequently treated are well known to the art. Examples of suitable compositions are disclosed in U. S. Patent No. 2,128,229 issued to Charch and Maney.

While we have herein disclosed specific embodiments of our invention, we do not intend to limit ourselves solely thereto, for it will be obvious to those skilled in the art that many modifications are within the spirit and scope of the invention as defined in the appended claim.

We claim:

In a process of treating cotton cord with a heat-hardening resorcinol-formaldehyde-latex adhesive, the steps which comprise subjecting the cotton cord in a relaxed state to the action of a penetrant and drying the cord under tension prior to treatment with the adhesive.

EDWARD T. LESSIG.
IVAN GAZDIK.